United States Patent
Seo (10) Patent No.: US 7,966,158 B2
(45) Date of Patent: Jun. 21, 2011

(54) MEASUREMENT APPARATUS

(75) Inventor: Yuzo Seo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 12/271,281

(22) Filed: Nov. 14, 2008

(65) Prior Publication Data
US 2009/0132192 A1    May 21, 2009

(30) Foreign Application Priority Data

Nov. 19, 2007 (JP) ................. 2007-298817

(51) Int. Cl.
*G01C 19/00* (2006.01)
(52) U.S. Cl. .............. 702/197; 702/151; 702/191
(58) Field of Classification Search .......... 702/94, 702/95
See application file for complete search history.

(56) References Cited

U.S. PATENT DOCUMENTS

| 4,458,322 | A | | 7/1984 | Veale | |
|---|---|---|---|---|---|
| 5,239,490 | A | * | 8/1993 | Masaki et al. | 702/41 |
| 5,581,488 | A | | 12/1996 | Seo | |
| 2004/0012389 | A1 | * | 1/2004 | Maiwald | 324/252 |
| 2004/0172208 | A1 | * | 9/2004 | Freitag et al. | 702/66 |
| 2005/0151532 | A1 | * | 7/2005 | Seki | 324/76.39 |
| 2007/0288187 | A1 | * | 12/2007 | Finkler et al. | 702/94 |

FOREIGN PATENT DOCUMENTS

| JP | 01-197266 A | 8/1989 |
|---|---|---|
| JP | 03-071017 A | 3/1991 |
| JP | 04-096130 A | 3/1992 |
| JP | 04-096131 A | 3/1992 |

* cited by examiner

*Primary Examiner* — Jonathan C Teixeira Moffat
(74) *Attorney, Agent, or Firm* — Canon U.S.A., Inc. IP Division (57) ABSTRACT

The measurement apparatus includes a distortion correcting unit configured to generate a plurality of correction signals by correcting the plurality of signals using a distortion coefficient which is stored in the apparatus, a square-root of sum of squares arithmetic unit configured to calculate a square-root of sum of squares of the plurality of correction signals, a first normalizing unit configured to generate a plurality of first normalized signals by dividing each of the plurality of correction signals by the square-root of sum of squares, and a phase arithmetic unit configured to calculate the position of the object based on the plurality of first normalized signals.

4 Claims, 10 Drawing Sheets

(a) ZERO POINT ERROR

AVERAGE OF VALUES IN PHASES 0 AND π CHANGES (b) AMPLITUDE ERROR

DIFFERENCE OF VALUES IN PHASE 0 AND π CHANGES (c) PHASE ERROR

DIFFERENCE OF VALUES IN PHASES π/2 AND 3π/2 INDICATES OTHER THAN ZERO

MEASUREMENT APPARATUS

BACKGROUND OF THE INVENTION

1. Field of the Invention

The present invention relates to a measurement apparatus, and more particularly to a measurement apparatus which measures a position of an object to be measured with high accuracy based on a signal whose phase changes in accordance with the change of the position of the object to be measured.

2. Description of the Related Art

Conventionally, as a detecting unit which detects a position or an angle of an object to be measured, a detecting unit such as an encoder, a resolver, and a laser interferometer is industrially widely used. These detecting units output a plurality of signals whose phases change in accordance with the change of the position or the angle of the object to be measured.

Some detecting units output two-phase signals corresponding to a sine and a cosine, and other detecting units output their inverse signals. Furthermore, there are detecting units which output three-phase signals whose phases are 120° different from one another.

As a means for obtaining fine position information or angle information using these signals, a method of converting each signal that is an analog signal into a digital signal and performing an arc tangent calculation or the corresponding arithmetic processing by a digital arithmetic unit is widely used.

In the present age, an analog to digital converter which has a resolution of 14 to 16 bits can be easily obtained. The phase information which divides one cycle of a signal into equal to or more than several ten thousands can be obtained by the digital calculation if these analog to digital converters are used.

However, the signal outputted from the detecting unit is an analog signal. Therefore, an error (distortion) relative to an ideal state occurs in a zero point, an amplitude, and a phase difference between the signals caused by the temperature change or the change with the passage of time. Generally, in the detecting unit which divides one cycle of the signal into several hundreds, these distortions can not be ignored. The detecting unit operates by the power or the light beam which is provided, and also the intensity change of the power or the light beam by a noise can not be ignored.

The technology which removes the distortion component contained in a signal has been known from a long time ago. For example, U.S. Pat. No. 4,458,322 proposes a technology which removes an offset (a zero point) error and an amplitude error by processing a sine and a cosine signals outputted from an optical encoder. Japanese Patents No. 2,790,863, No. 2,893,340, No. 2,839,340, and No. 2,839,341, and U.S. Pat. No. 5,581,488 propose a technology which removes a phase error and an error caused by a high-harmonic distortion other than the errors of the zero point and the amplitude.

However, in all of the above references, an error coefficient which causes a distortion is calculated using a signal outputted from the detecting unit as it is. Therefore, a variety of errors contained in the signal superimposedly act on the signal and complexly deforms the output signal of the detecting unit. As a result, it was difficult to estimate the contained amount of the distortion component with high accuracy, and the detected phase contained a great error.

With respect to the signal outputted from the detecting unit, the electrical noise superimposed on a power supply line, the intensity change of the light source specifically in an optical detecting unit, and the like, other than the distortion component, can not be ignored. The electrical noise and the intensity change of the light source and the like was also a factor of the error contained in the measured phase.

BRIEF SUMMARY OF THE INVENTION

The present invention provides a measurement apparatus which measures the position of the object to be measured with high accuracy.

A measurement apparatus as one aspect of the present invention is a measurement apparatus configured to measure a position of an object to be measured using a plurality of signals representing the position of the object to be measured. The measurement apparatus includes a distortion correcting part configured to generate a plurality of correction signals by correcting the plurality of signals using a distortion coefficient which is stored in the measurement apparatus, a distortion coefficient arithmetic unit configured to correct and update the distortion coefficient by comparing each of the plurality of correction signals with an ideal signal waveform, a square-root of sum of squares arithmetic unit configured to calculate a square-root of sum of squares of the plurality of correction signals generated by the distortion correcting part, a first normalizing part configured to generate a plurality of first normalized signals by dividing each of the plurality of correction signals by the square-root of sum of squares, and a phase arithmetic unit configured to calculate the position of the object to be measured based on the plurality of first normalized signals calculated by the first normalizing part.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.
(Configuration of Encoder 200)

Figure 9:
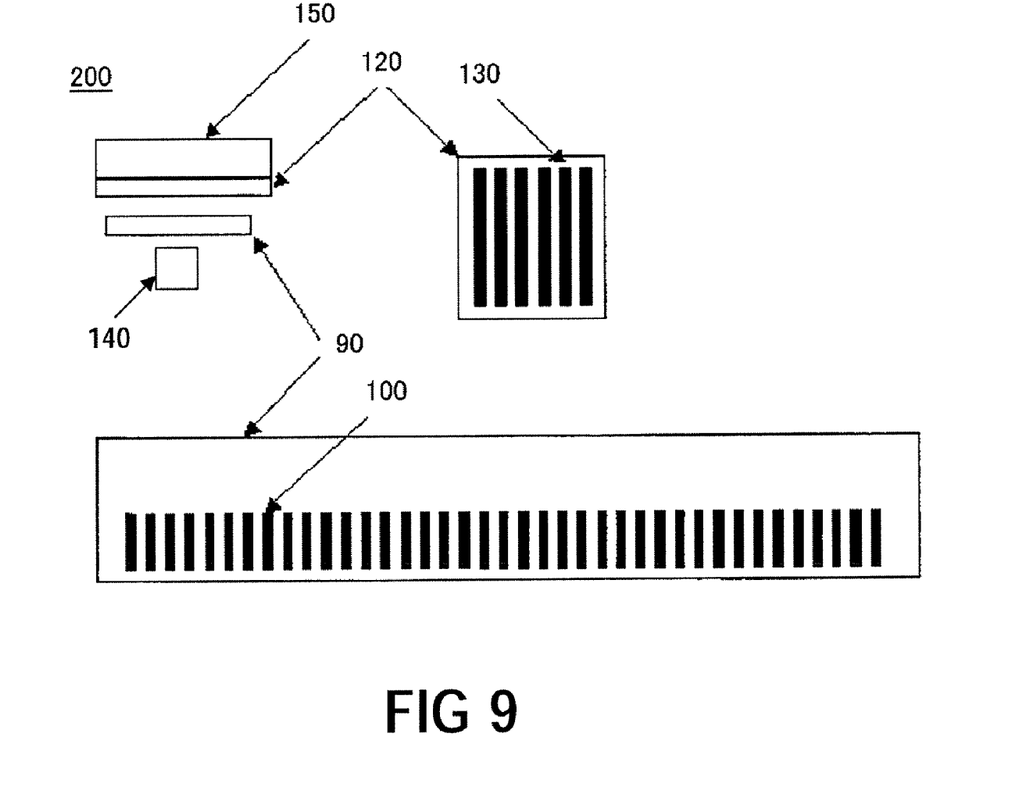
FIG. 9 is a schematic view of an encoder which is used as an example of a detecting unit.

First, the configuration of an encoder 200 which is used as one example of a detecting unit will be described. FIG. 9 is a schematic view of the encoder 200.

The encoder 200 is an optical linear encoder and measures a linear mechanical displacement of an object to be measured. The encoder 200 includes a moving scale 90, a fixed scale 120, a light emitting device (a light emitting diode) 140, and a light receiving device (a photodiode) 150.

The moving scale 90 is configured to be able to linearly move with the object to be measured. On the other hand, the fixed scale 120 is fixed. The encoder 200 is configured to arrange the moving scale 90 and the fixed scale 120 between the light emitting device 140 and the light receiving device 150. The moving scale 90 is provided with slits 100 at a constant width for measuring a moving distance.

The fixed scale 120 is positioned so as to face the moving scale 90, and has fixed slits 130 at the same pitch. The right half and the left half of the fixed scale 120 are provided with openings at positions where the phases are 90° different from each other, i.e. at positions where the scale pitches are different by ¼. The light receiving device 150 is provided at a back side, i.e. a side opposite to the side at which the moving scale 90 is positioned, of the fixed scale 120. The light receiving device 150 has two light receiving parts corresponding to the positions of the right half or the left half of the fixed scale, and the two light receiving parts output a cosine signal and a sine signal whose phases are 90° different from each other, respectively.

The light emitting device 140 is provided at the back side of the moving scale 90, i.e. at the side opposite to the side where the fixed scale 120 is positioned. The light emitting device 140 always lights in order to measure the displacement length of the object to be measured. The light of the light emitting device 140 is transmitted or blocked in accordance with the movement of the moving scale 90.

The cosine signal and the sine signal obtained as described above are supplied to the measurement apparatus and the position or the angle of the object to be measured is measured.
(Configuration of Laser Interferometer 300)

Figure 10A:
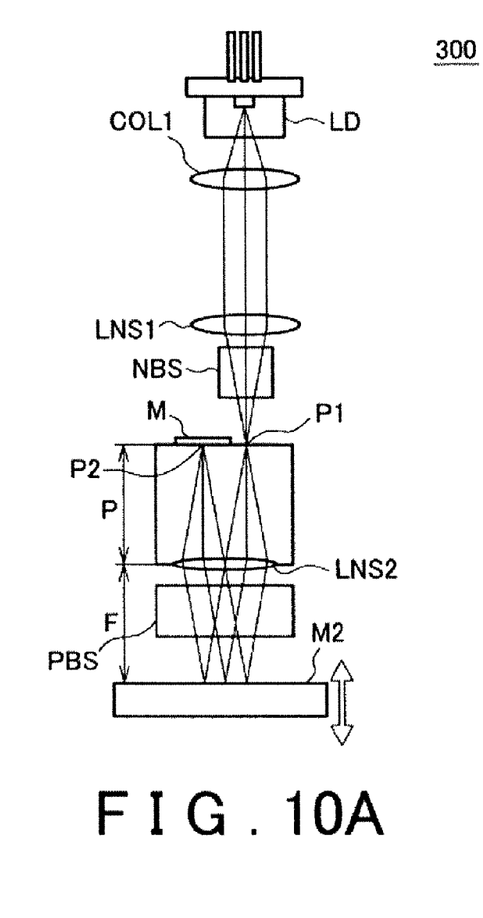
FIG. 10A is a side view of a laser interferometer which is used as an example of a detecting unit.
Figure 10B:
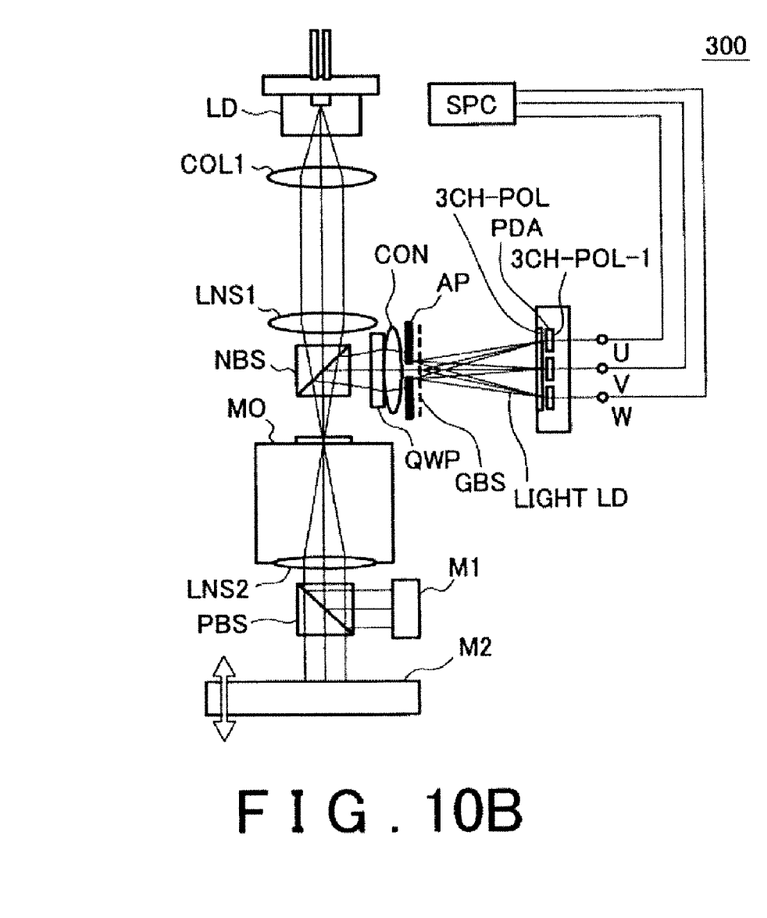
FIG. 10B is a front view of a laser interferometer which is used as an example of a detecting unit.

Next, the configuration of a laser interferometer 300 which is used as a detecting unit of the present embodiment will be described. FIG. 10A is a side view of the laser interferometer 300, and FIG. 10B is a front view of the laser interferometer 300.

In the laser interferometer 300, a surface emitting laser (VCSEL: Vertical Cavity Surface Emitting Laser) whose laser wavelength λ is stable 0.85 μm is used as a high coherent single mode semiconductor laser LD (a semiconductor laser LD). A light beam from the semiconductor laser LD is converted to collimated light (parallel light) by a collimator lens COL1. The light is condensed and illuminates a position P1 on a focal plane of a lens LNS2 via a lens LNS1 and a half mirror NBS.

A parallel light beam whose optical axis is slightly tilted is formed by a lens LNS2 based on the light beam from the position P1 and is emitted. Furthermore, the parallel light beam is split into two light beams in accordance with the polarization component using a polarizing beam splitter (a light splitter) PBS. The reflected light (S-polarized light) from the polarizing beam splitter PBS enters a reference mirror (a reference plane) M1, and the transmitted light (P-polarized light) from the polarizing beam splitter PBS enters a measurement mirror (a measurement plane) M2 as a plane to be measured.

Each of the reflected lights is synthesized via the polarizing beam splitter PBS. The synthesized light is condensed and illuminates a mirror M (position P2) that is a focal plane of the lens LNS2. The light is returned to the original optical path by a reflective film M0 disposed in the vicinity of the mirror M. The reflected light from the position P2 is emitted from the lens LNS2 as a parallel light beam, and is split into two light beams by the polarizing beam splitter PBS. The reflected light (S-polarized light) illuminates the reference mirror M1 and the transmitted light (P-polarized light) illuminates the measurement mirror M2 that is an object to be measured.

Each of the reflected lights is condensed and illuminates the position P1 of the focal plane of the lens LNS2 via the polarizing beam splitter PBS.

The light beam is taken from there to the side of a light source. The S-polarized light goes and returns twice between the reference mirror M1 and the polarizing beam splitter PBS, and the P-polarized light goes and returns twice between the measurement mirror M2 and the polarizing beam splitter PBS. These light beams are taken at a side of a light receiving system by a non-polarizing beam splitter (a half mirror) NBS, transmit a quarter wavelength plate QWP, and are converted to linear polarized light whose polarizing light direction rotates in accordance with the change of the phase difference.

This light beam is split into three light beams by a beam splitting device GBS via a condensing lens CON and an aperture AP. These three light beams enter a polarizing element array 3CH-POL in which transmission axes are arranged so as to be 60° different from one another. The light that has passed through the polarizing element array 3CH-POL enters a light receiving part of a three-splitting light receiving device PDA. Thus, three interference signals U, V, and W, which have a phase 120° different from one another, based on the out-of-plane displacement of the measurement mirror M2 (a plane to be measured) are detected. The detected interference signals U, V, and W are inputted to a signal processor SPC (a measurement apparatus).
(Configuration of Measurement Apparatus 100)

Next, a measurement apparatus which measures the position or the angle of the object to be measured, based on the signal outputted from the detecting unit such as the encoder 200 or the laser interferometer 300, will be described.

Figure 1:
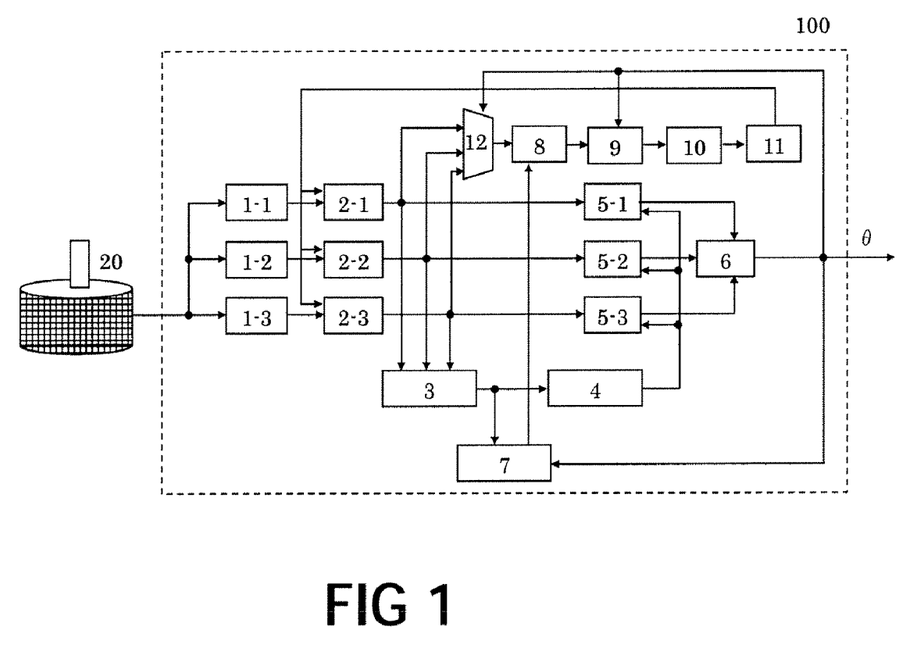
FIG. 1 is a block diagram of a measurement apparatus in the embodiment of the present invention.

FIG. 1 is a block diagram of a measurement apparatus 100 as one example of the present invention. The measurement apparatus 100 calculates the position or the angle of the object to be measured, based on three-phase signals (U-phase signal, V-phase signal, and N-phase signal) outputted from a detecting unit 20 such as a laser interferometer 300. The measurement apparatus 100 of the present embodiment is configured so that the three-phase signals are inputted. However, the present embodiment can be applied to the detecting unit such as an encoder 200 which outputs two-phase signals (a cosine signal and a sine signal).

The U-phase signal, the V-phase signal, and the W-phase signal (three-phase signals) outputted from the detecting unit 20 are inputted to three analog to digital converters 1-1, 1-2, and 1-3 which are independent from one another, respectively. The three-phase signals (input signals) outputted from the detecting unit 20 are analog signals. These input signals are converted to digital signals by the analog to digital converters 1-1, 1-2, and 1-3. Each of the analog to digital converters 1-1, 1-2, and 1-3 removes the in-phase noise by subtracting ½ of the sum of other signals and also adjusts the zero point of the average of each of the digital signals so as to be zero.

The digital signals outputted from the analog to digital converters 1-1, 1-2, and 1-3 are inputted to distortion correcting parts 2-1, 2-2, and 2-3. The distortion correcting parts 2-1, 2-2, and 2-3 correct the zero point, the amplitude, and the phase difference of the input signals. The zero point error, the amplitude error, and the phase difference error of the input signals are removed by this correction. Thus, the distortion correcting parts 2-1, 2-2, and 2-3 generate a plurality of correction signals by correcting a plurality of signals using a distortion coefficient (an error coefficient) stored inside the measurement apparatus 100.

Figure 2:
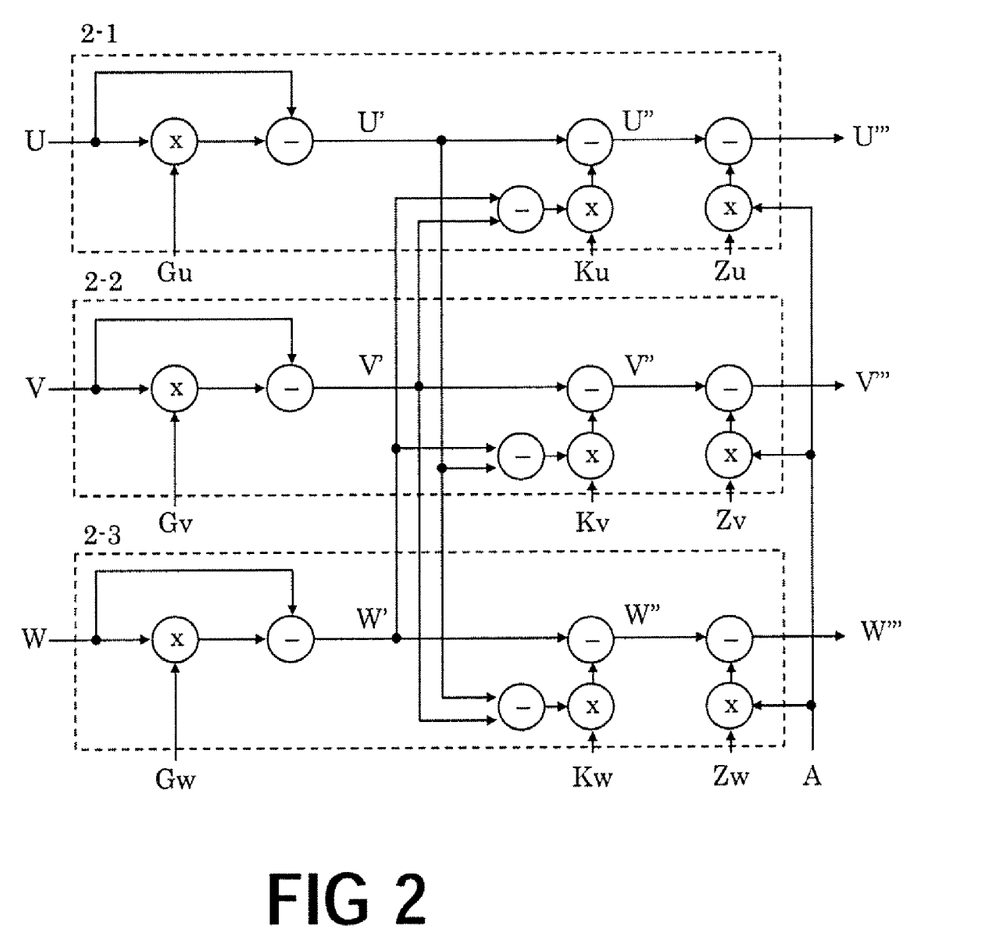
FIG. 2 is a block diagram of a distortion correcting part in the embodiment of the present invention.

FIG. 2 is a block diagram of the distortion correcting parts 2-1, 2-2, and 2-3.

The distortion correcting parts 2-1, 2-2, and 2-3 calculate signals U·Gu, V·Gv, and W·Gw by multiplying amplitude error coefficients Gu, Gv, and Gw to digital signals (U, V, W) outputted from the analog to digital convertors 1-1, 1-2, and 1-3. Furthermore, the distortion correcting parts 2-1, 2-2, and 2-3 subtract the signals U·Gu, V·Gv, and W·Gw from the signals U, V, and W to calculate signals U(1-Gu), V(1-Gv), and W(1-Gw) These signals are represented as U', V', and W'.

Each of the distortion correcting parts 2-1, 2-2, and 2-3 subtracts one signal among signals of the other two distortion correcting parts from the other signal (W'-V', U'-W', and V'-U'). Furthermore, the distortion correcting parts 2-1, 2-2, and 2-3 multiply phase error coefficients Ku, Kv, and Kw to the subtracted values to calculate signals Ku(W'-V'), Kv(U'-W'), and Kw(V'-U'). The distortion correcting parts 2-1, 2-2, and 2-3 subtract the signals Ku(W'-V'), Kv(U'-W'), and Kw(V'-U') from the signals U', V', and W', respectively. The signals calculated at this time are represented as U", V", and W", respectively.

The distortion correcting parts 2-1, 2-2, and 2-3 multiply the average value A in one cycle of the signals which is a square-root of sum of squares of the correction signals to the zero point error coefficients Zu, Zv, and Zw to calculate signals A·Zu, A·Zv, and A·Zw. The zero point error coefficients Zu, Zv, and Zw are error coefficients which are calculated with respect to a signal whose amplitude is normalized. The distortion correcting parts 2-1, 2-2, and 2-3 subtract the signals A·Zu, A·Zv, and A·Zw from the signals U", V", and W" to generate correction signals U'", V'", and W'", respectively.

The amplitude error coefficients Gu, Gv, and Gw, the phase error coefficients Ku, Kv, and Kw, and the zero point error coefficients Zu, Zv, and Zw are supplied from a distortion coefficient arithmetic unit 11 which calculates a distortion coefficient (error coefficient) of each of the plurality of signals.

Each of the correction signals U'", V'", and W'" generated by the distortion correcting parts 2-1, 2-2, and 2-3 is inputted to a square-root of sum of squares arithmetic unit 3. The square-root of sum of squares arithmetic unit 3 calculates a square-root of sum of squares $\sqrt{U'''^2+V'''^2+W'''^2}$ of each of the inputted correction signals U'", V'", and W'". In other words, the square-root of sum of squares arithmetic unit 3 calculates the amplitude as whole correction signals.

The sum of squares of the three-phase signals whose phases are 120° different from one another is 1.5 when the amplitude is 1. Therefore, the square-root of sum of squares can be related to the amplitude by dividing the calculated result by the square root of 1.5. When the detecting unit such as the encoder 200 which outputs two-phase signals is used, the square-root of sum of squares can be adopted as it is.

In the present embodiment, for easy understanding, it is described that the normalized signal is a sine wave which oscillates in the range of 0±1. However, in the actual measurement apparatus, the normalized signal is expressed by a signed binary number, and the amplitude can be arbitrarily set. Therefore, specifically in the measurement apparatus 20 which processes the three-phase signals, the amplitude of the normalized signal can also be selected so as to simplify the arithmetic processing.

A divider 4 calculates an inverse of the square-root of sum of squares obtained by the square-root of sum of squares arithmetic unit 3. Multipliers 5-1, 5-2, and 5-3 multiply the inverse of the square-root of sum of squares obtained by the divider 4 to each of the correction signals outputted from the distortion correcting parts 2-1, 2-2, and 2-3.

The calculation performed by the divider 4 and the multipliers 5-1, 5-2, and 5-3 corresponds to the division of the correction signals by the square-root of sum of squares. In the present embodiment, such a calculation is performed by the combination of the divider 4 and the multipliers 5-1, 5-2, and 5-3 because a lot of logic devices are needed in order to constitute a divider, compared to a multiplier. Therefore, if the multipliers 5-1, 5-2, and 5-3 are used like the present embodiment, total number of the necessary logic devices can be reduced. However, the measurement apparatus can be constituted so that each of the correction signals is divided by the square-root of sum of squares directly using a divider.

As described above, a first normalized signal in which an instant change caused by a noise or the like has been removed is generated by dividing the correction signals by the square-root of sum of squares by the multipliers 5-1, 5-2, and 5-3. The divider 4 and the multipliers 5-1, 5-2, and 5-3 which calculate the first normalized signal are collectively called a first normalizing part. Thus, the first normalizing part generates a plurality of first normalized signals by dividing each of the plurality of correction signals by the square-root of sum of squares.

In the present embodiment, the first normalized signal is generated based on the correction signals U'", V'", and W'". However, instead of this, the zero point error can also be corrected after dividing the correction signals U", V", and W" before correcting the zero point error by the square-root of sum of squares.

The phase signal (angle θ) can be obtained by performing the arithmetic processing of the first normalized signal by a phase arithmetic unit 6. A variety of methods are known as a calculation method of the phase arithmetic unit 6. As a typical calculation method, αβ conversion can be cited. The αβ conversion calculates a cosine signal A and a sine signal B by the calculation of A=(U−(V+W)/2)/1.5 and B=(V−W)/√3, and performs arc tangent calculation with respect to these signals A and B. The angle θ, i.e. the phase signal, can be obtained by such a calculation. The arc tangent calculation is a calculation of the declination and corresponds to the calculation of the function ATAN2 (B, A) in C language. Thus, the phase arithmetic unit 6 calculates the position or the angle of the object to be measured, based on the plurality of first normalized signals calculated by the first normalizing part.

The square-root of sum of squares calculated by the square-root of sum of squares arithmetic unit 3 is inputted to an averaging arithmetic unit 7. The averaging arithmetic unit 7 calculates an average of the square-root of sum of squares which is obtained by averaging the square-root of sum of squares of the plurality of correction signals (the amplitude value) in one cycle of the signal.

Figure 3:
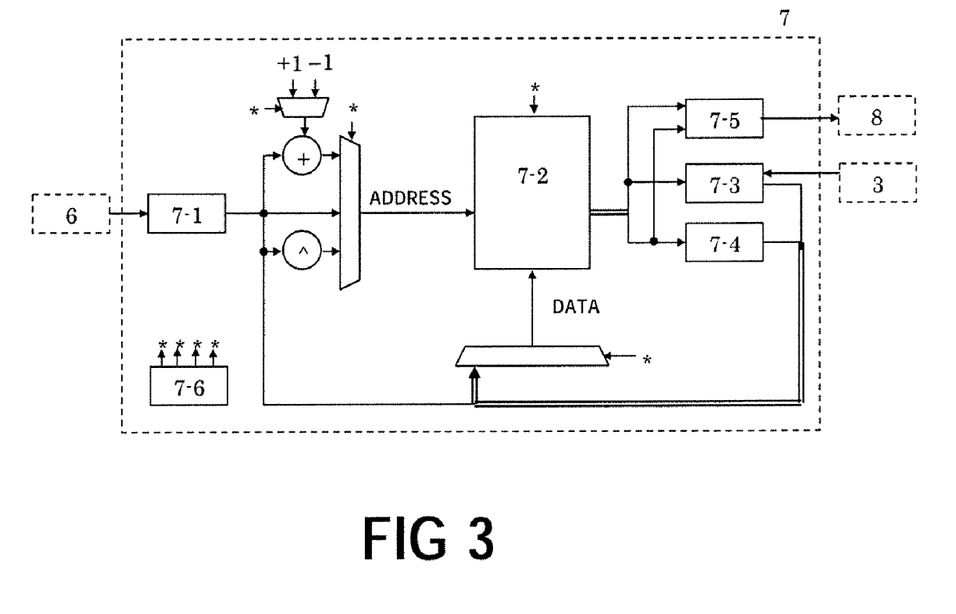
FIG. 3 is a block diagram of an averaging arithmetic unit in the embodiment of the present invention.

FIG. 3 shows a block diagram of the averaging arithmetic unit 7. The averaging arithmetic unit 7 includes a wave number arithmetic unit 7-1 which obtains a wave number of the signal extending the digit of phase information, a random access memory (RAM) 7-2, an adder 7-3, a controller 7-4, and a divider 7-5.

Figure 4:
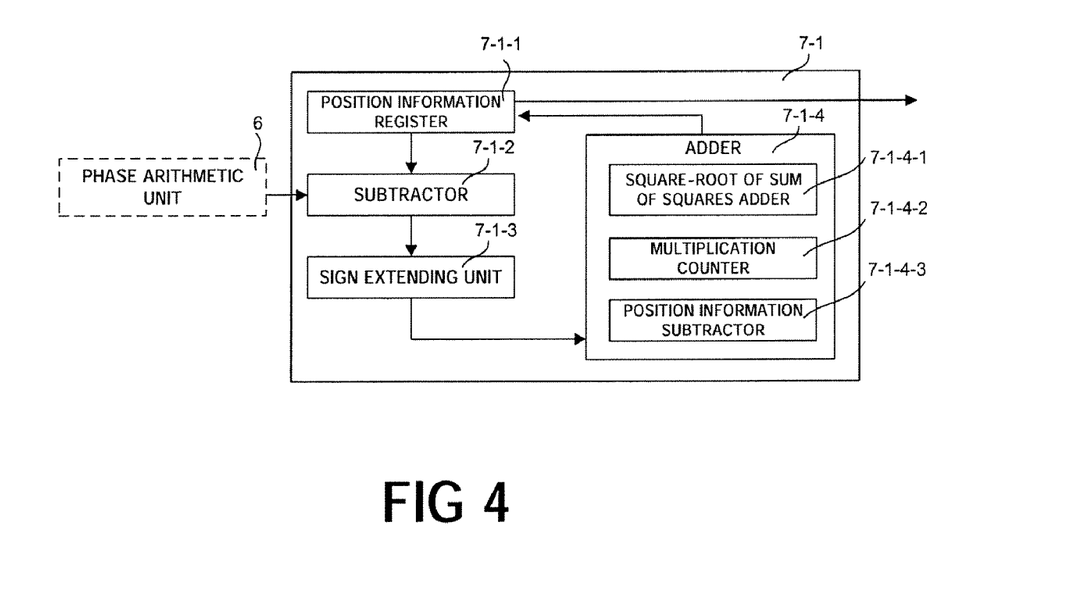
FIG. 4 is a block diagram of a wave number arithmetic unit in the embodiment of the present invention.

FIG. 4 shows a block diagram of the wave number arithmetic unit 7-1 in the present embodiment. The wave number arithmetic unit 7-1 includes a position information register 7-1-1 which has the digit number which is greater than that of the phase information, and a subtractor 7-1-2 which subtracts the lower bits of this register from the phase signal (angle θ). The wave number arithmetic unit 7-1 includes a sign extending unit 7-1-3 which extends the sign bit of the subtracted result in accordance with the bit length of the phase information register, and an adder 7-1-4 which adds the sign extended difference to the position information register 7-1-1. After the phase arithmetic unit 6 obtains the phase signal, the position information register 7-1-1 stores the added result calculated by the adder 7-1-4. Thus, the lower bits of the position information register 7-1-1 coincide with the phase signal, and the position information corresponding to the wave number of the signal can be obtained by the higher bits.

The random access memory 7-2 is, for example, has areas for storing four to eight groups of data are stored. The multiplied value of the square-root of sum of squares, the multiplied number of times, and the content of the position information register 7-1-1 when performing a multiplication at the previous time, are stored in each of the areas. When the position information is obtained by the wave number arithmetic unit 7-1, the random access memory 7-2 is referred with the wave number of the position information register 7-1-1 as an address.

Reference numeral "*" denotes a timing signal for referring the random access memory 7-2. This timing signal is outputted from a signal generator 7-6. The operation of the random access memory 7-2 and each part at the periphery can be controlled based on the timing signal.

While the object to be measured remains stationary, in order to avoid excessive multiplication, if the position information obtained at this time and the position information obtained at the previous time are close to each other, it is preferable that the multiplication processing is not performed. It is also preferable that the multiplication processing is not performed in the case where the multiplied value overflows or the multiplication number of times overflows. The overflow of the multiplication value is detected by a square-root of sum of squares adder 7-1-4-1. The overflow of the multiplication number of times is detected by a multiplication counter 7-1-4-2. Whether or not the position information obtained at this time and the position information obtained at the previous time are close is detected by performing a logical determination of the result of the position information subtractor 7-1-4-3.

A controller 7-4 clears the area where is the most distant from a write area to zero and reads out the data from the area where the multiplication is completed, in addition to perform these writing control. The logical calculation is performed synchronized with a clock signal. The logical calculation synchronized with the clock signal can be performed by preparing a state register which has a few bits for counting the clock signal and by constituting the logic circuit so as to operate differently in accordance with the value of the state register.

The analog to digital converters 1-1, 1-2, and 1-3 generally performs the analog to digital conversion per a few microseconds (μs) or per a few hundreds of nanoseconds (ns). Therefore, the data in the position information register 7-1-1 are also updated at this time interval. On the other hand, the logic circuit of the controller 7-4 performs the logical calculation at a few hundreds of megahertz (MHz), i.e. per a few nanoseconds (ns). It is also possible that one logical arithmetic device is used for measuring a plurality of phases. Even in that case, it is possible to perform the logical calculation several times per one phase measurement.

In clearing the area at the most distant from the writing area to zero, the area to be cleared to zero can be pointed using exclusive OR of the value of two bits selecting the area of the random access memory 7-2 and the binary value 10 as an address. In this case, for example, it is assumed that the random access memory 7-2 has four multiplication areas and selects the area to be multiplied by the two-bit address.

The multiplication completing area compares the address where the multiplication has been performed at the previous time with the address where the multiplication is to be performed at this time. If the comparison result increases, the multiplication area corresponding to the address one lower than the writing area can be selected. On the other hand, if the comparison result decreases, the multiplication area corresponding to the address one higher than the writing area can be selected.

The average value in one cycle of the signal of the square-root of sum of squares can be calculated by a divider 7-5, based on the multiplication value of the square-root of sum of squares and the multiplication number of times of the correction signal which has been stored in the selected multiplication completing area.

A second normalized signal is calculated using the average value of the square-root of sum of squares in one cycle of the signal which has been obtained in this way. This method is substantially the same as that of the process in which the first normalized signal is generated as described above. However, it is different in that the average value of the square-root of sum of squares of the correction signal in one cycle of the signal is used, instead of using the square-root of sum of squares of the correction signal. The second normalized signal is used for extracting the information on the distortion of the original signal.

The first normalized signal is normalized by dividing the instant correction signal by the square-root of sum of squares. For example, even if the amplitude of a certain signal is extraordinarily large, the square-root of sum of squares of the correction signal also has a large value at the part where the absolute value of the signal is large. When performing a division by using the square-root of sum of squares indicating such a large value, the abnormality of the amplitude is suppressed in the first normalized signal. Therefore, the first normalized signal can not be used for extracting the information on the distortion of the original signal.

On the other hand, the second normalized signal is normalized using the average value in a cycle of the signal. Therefore, if the correction information in at least one of the signals includes an error and the distortion remains in the correction signal, the distortion appears in the second normalized signal as it is.

Next, the method of extracting the information on the distortion of the original signal using the phase signal and the second normalized signal will be described. The present embodiment will focus on the signal which is approximated by a cosine. However, it is apparent that the same is true for other signals by shifting the phase.

Figure 5:
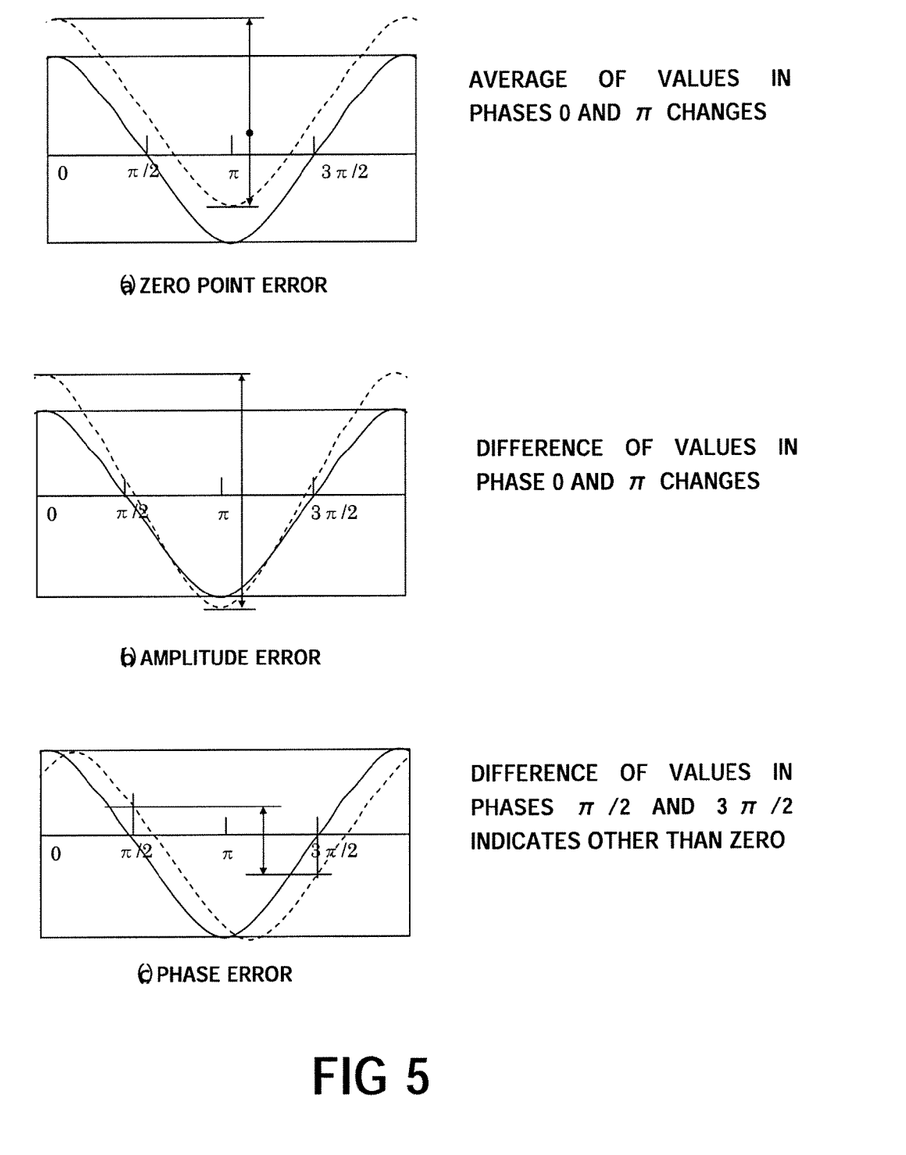
FIG. 5A is a waveform diagram showing a state where an original signal includes a distortion (a zero point error) in the embodiment of the present invention.
FIG. 5B is a waveform diagram showing a state where an original signal includes a distortion (an amplitude error) in the embodiment of the present invention.
FIG. 5C is a waveform diagram showing a state where an original signal includes a distortion (a phase error) in the embodiment of the present invention.

FIGS. 5A to 5C show a waveform of the original signal when a distortion is generated. FIG. 5A shows a state where an error of the zero point is generated, FIG. 5B shows a state where an error of the amplitude is generated, and FIG. 5C shows a state where an error of the phase is generated.

Whether or not the original signal contains the distortion shown in FIGS. 5A to 5C is determined using the phase information (angle θ) outputted from the phase arithmetic unit 6 and picking up the second normalized signal when the angle θ is 0, π/2, π, and 3π/2.

Figure 6:
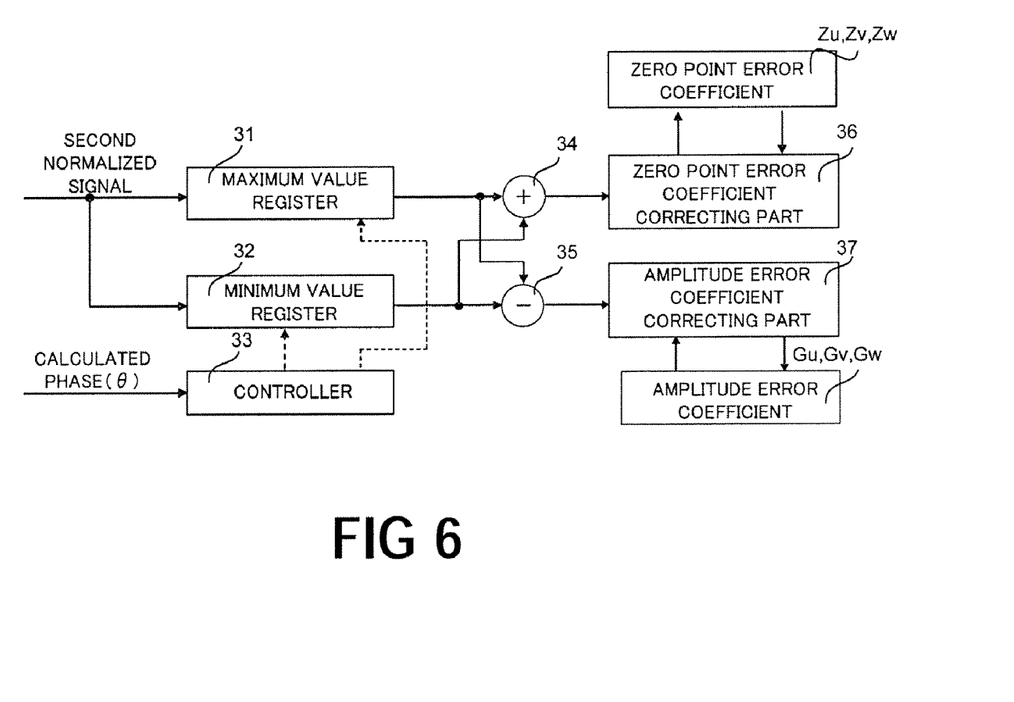
FIG. 6 is a block diagram of an arithmetic unit which corrects a zero point error coefficient and an amplitude error coefficient in the embodiment of the present invention.

FIG. 6 is a block diagram of a distortion coefficient arithmetic unit 11 which corrects the zero point error coefficient and the amplitude error coefficient.

When the second normalized signal inputted from a divider 8 coincides with the cosine function which oscillates in the range of 0±1, as shown in FIGS. 5A to 5C, the second normalized signal indicates a maximum value 1 at phase 0 and indicates a minimum value −1 at phase π. Therefore, if the distortion is completely removed, the average of the second normalized signals taken at the two points of the above phases is 0. In this case, the difference of the second normalized signals taken at the two points of the above phases is 2, which is obtained by subtracting the minimum value −1 from the maximum value 1.

However, if an error occurs at the zero point of the second normalized signal, as shown in FIG. 5A, the average of the second normalized signals indicates a value other than 0. Furthermore, as shown in FIG. 5B, the difference of the second normalized signals indicates a value other than 2. The error of the second normalized signal has an amount proportional to the difference of each of the error coefficients. The second normalized signal can be close to a more appropriate value by subtracting a part of it from the error coefficient stored in the apparatus.

Therefore, in the distortion coefficient arithmetic unit 11 shown in FIG. 6, the zero point error coefficients Zu, Zv, and Zw and the amplitude error coefficients Gu, Gv, and Gw are corrected and updated. Thus, the distortion coefficient arithmetic unit 11 corrects and updates the distortion coefficient by comparing each of the plurality of the correction signals with an ideal signal waveform.

In FIG. 6, the second normalized signal (a second correction signal) is inputted to a maximum value register 31 and a minimum value register 32. The phase information (angle θ) calculated by the phase arithmetic unit 6 is inputted to a controller 33. When the angle θ calculated by the phase arithmetic unit 6 is 0, the controller 33 outputs a command signal to the maximum register 31 so as to pick up the second normalized signal to store it. When the maximum value register 31 receives the command signal from the controller 33, it stores the second normalized signal at the time. Thus, the maximum register 31 is a first memory which stores the second normalized signal at the time when the phase calculated by the phase arithmetic unit 6 is a first phase (θ=0) as a maximum value of the second normalized signal.

When the angle θ calculated by the phase arithmetic unit 6 is π, the controller 33 outputs a command signal to the minimum value register 32 so as to pick up the second normalized signal to store it. When the minimum value register 32 receives the command signal from the controller, it stores the second normalized signal at the time. Thus, the minimum register 32 is a second memory which stores the second normalized signal at the time when the phase calculated by the phase arithmetic unit 6 is a second phase (θ=π) as a minimum value of the second normalized signal.

The second normalized signals stored in the maximum value register 31 and the minimum value register 32 are added by an adder 34. If the second normalized signal includes the zero point error, the added value by the adder 34 is a value other than 0. The added value is inputted to a zero point error coefficient correcting part 36. The zero point error coefficient correcting part 36 corrects and updates the current zero point error coefficients Zu, Zv, and Zw so that the added value is 0, based on the current zero point error coefficients Zu, Zv, and Zw and the added value. Thus, the zero point error coefficient correcting part 36 corrects the zero point error coefficient of the second normalized signal based on the average of the second normalized signals stored in the first memory and the second memory.

The second normalized signals stored in the maximum value register 31 and the minimum value register 32 are subtracted by a subtractor 35. When the second normalized signal contains an amplitude error, the subtracted value by the subtracter 35 is other than 2. The subtracted value is inputted to an amplitude error coefficient correcting part 37. The amplitude error coefficient correcting part 37 corrects and updates the current amplitude error coefficients Gu, Gv, and Gw so that the subtracted value is 2, based on the current amplitude error coefficients Gu, Gv, and Gw and the subtracted value. Thus, the amplitude error coefficient correcting part 37 corrects the amplitude error coefficient of the second normalized signal based on the difference of the second normalized signals stored in the first memory and the second memory.

The zero point error coefficients Zu, Zv, and Zw and the amplitude error coefficients Gu, Gv, and Gw which are corrected and updated are fed back to the distortion correcting parts 2-1, 2-2, and 2-3 to be used for correcting the original signal.

Figure 7:
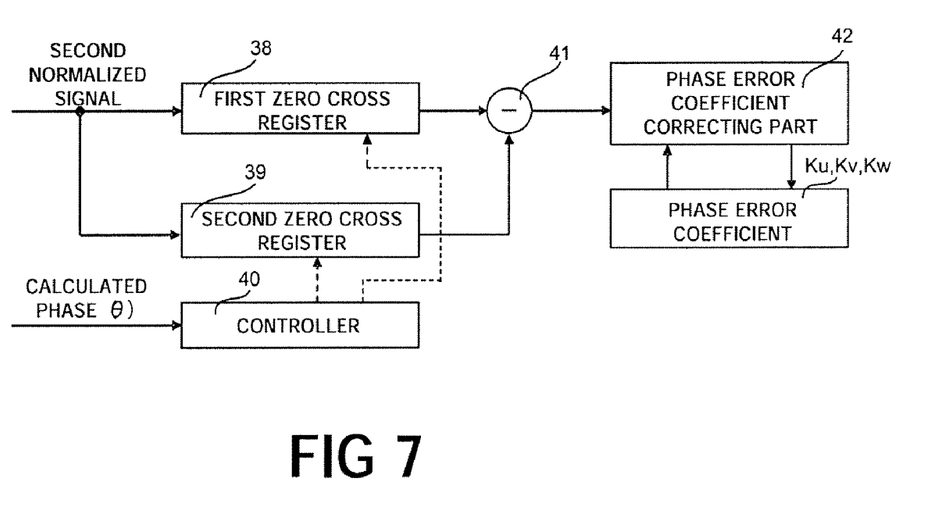
FIG. 7 is a block diagram of an arithmetic unit which corrects a phase error coefficient in the embodiment of the present invention.

FIG. 7 is a block diagram of the distortion coefficient arithmetic unit 11 which corrects the phase error coefficient.

When the second normalized signal inputted from the divider 8 coincides with the cosine function, both the second normalized signals at the phases of π/2 and 3π/2 indicate 0. However, when an error occurs with respect to a phase of the second normalized signal, as shown in FIG. 5C, the second normalized signals at the phases of π/2 and 3π/2 indicate a value other than 0.

The error of the phase error coefficients Ku, Kv, and Kw is proportional to the difference of the second normalized signals at the phases of π/2 and 3π/2. Also with respect to the phase error coefficient, it can be close to a more appropriate value by subtracting the part of it from the error coefficient value stored in the apparatus.

In FIG. 7, the second normalized signal is inputted to a first zero cross register 38 and a second zero cross register 39. The phase information (angle θ) calculated by the phase arithmetic unit 6 is inputted to a controller 40.

When the angle θ calculated by the phase arithmetic unit 6 is π/2, the controller 40 outputs a command signal to the first zero cross register 38 so as to pick up and store the second normalized signal. When the first zero cross register 38 receives the command signal from the controller 40, it stores the second normalized signal at the time. Thus, the first zero cross register 38 is a third memory which stores the second normalized signal at the time when the phase calculated by the phase arithmetic unit 6 is a third phase (θ=π/2) as a zero cross point of the second normalized signal.

Furthermore, when the angle θ calculated by the phase arithmetic unit 6 is 3π/2, the controller 40 outouts a command signal to the second zero cross register 39 so as to pick up and store the second normalized signal. When the second zero cross register 39 receives the command signal from the controller 40, it stores the second normalized signal at the time. Thus, the second zero cross register 39 is a fourth memory which stores the second normalized signal at the time when the phase calculated by the phase arithmetic unit 6 is a fourth phase (θ=3π/2) as a zero cross point of the second normalized signal.

The second normalized signals stored in the first zero cross register 38 and the second zero cross register 39 are subtracted by a subtracter 41. When the second normalized signal contains a phase error, the subtracted value by the subtractor 41 is other than 0. The subtracted value is inputted to a phase error coefficient correcting part 42. The phase error coefficient correcting part 42 corrects and updates the current phase error coefficients Ku, Kv, and Kw so that the subtracted value is 0 based on the current phase error coefficients Ku, Kv, and Kw and the subtracted value. Thus, the phase error coefficient correcting part 42 corrects the phase error coefficient of the second normalized signal, based on the difference of the second normalized signals stored in the third memory and the fourth memory.

It is preferable that the phase error coefficients Ku, Kv, and Kw for each of the signals are provided so that the total is equal to zero. Therefore, when the subtraction of the phase error coefficient with respect to a certain signal is performed, half the amount of the phase error coefficient is added to the other two phase error coefficients. If such a procedure is not performed, the problem that the phase error coefficients of all the signals are shifted in a positive or negative direction occurs. This problem can be avoided by keeping the total of the phase error coefficients at zero.

Figure 8:
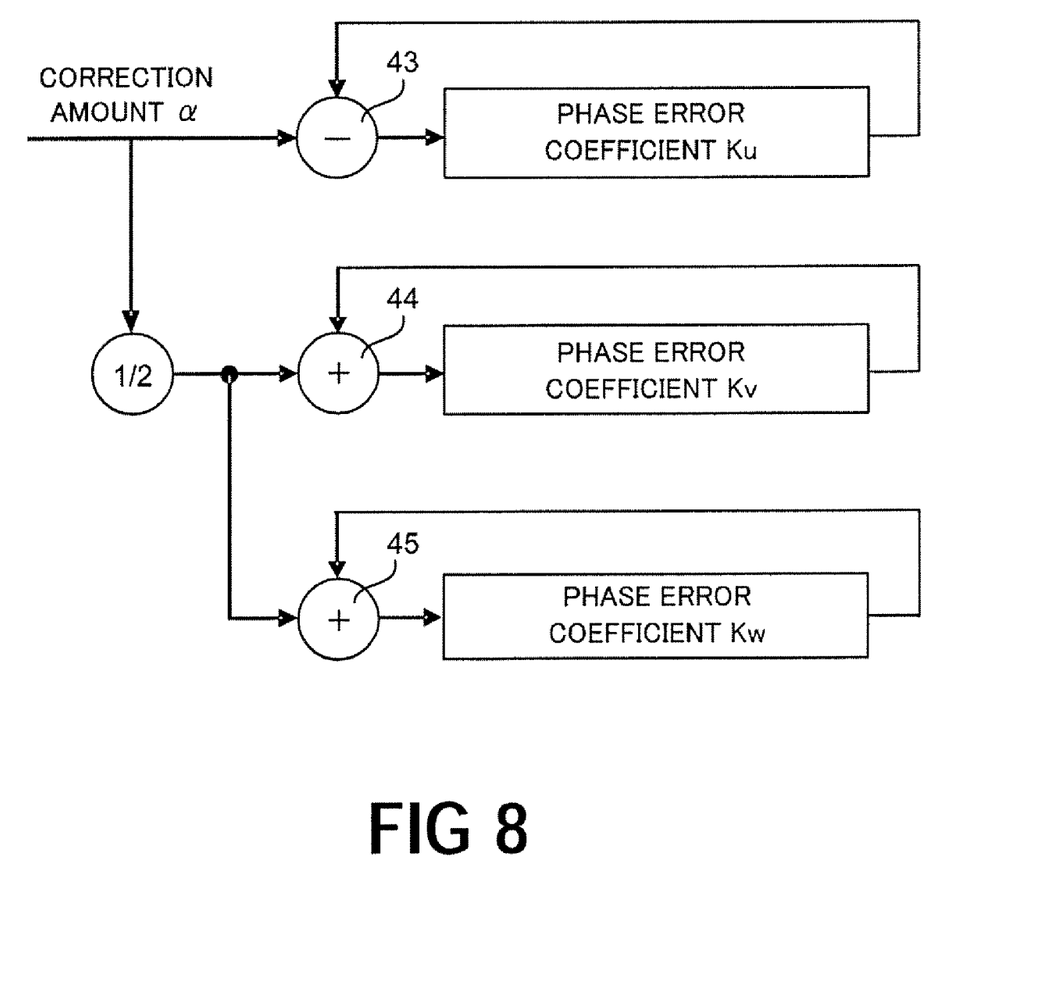
FIG. 8 is a block diagram of an arithmetic unit which has a configuration for keeping the sum of phase error coefficients at zero.

FIG. 8 shows a block diagram of the distortion coefficient arithmetic unit 11 which includes the configuration for keeping the total of the phase error coefficient at zero. FIG. 8 shows the case where a correction amount α is subtracted from the current phase error coefficient Ku, as one example.

A subtractor 43 subtracts the correction amount α from the current phase error coefficient Ku and updates the phase error coefficient Ku to the subtracted value. Furthermore, half of the value of the correction amount α is inputted to an adder 44. The adder 44 adds half of the value of the correction amount α to the current phase error coefficient Kv and updates the phase error coefficient Kv to the added value. Similarly, half of the value of the correction amount α is inputted to an adder 45. The adder 45 adds half of the value of the correction amount α to the current phase error coefficient Kw and updates the phase error coefficient Kw to the added value.

Thus, when the phase error coefficient correcting part 42 corrects the phase error coefficient with respect to each of the plurality of second normalized signals, it also corrects the phase error coefficients of the other signals. The correction amount at the time is determined so that the total of the correction amount of the phase error coefficient with respect to all the signals of the plurality of second normalized signals is zero. As described above, when a phase error coefficient of a certain signal is updated, the total of the phase error coefficients can be kept at zero also by updating also the other two phase error coefficients in accordance with updating the certain signal.

The updated phase error coefficients Ku, Kv, and Kw are fed back to the distortion correcting parts 2-1, 2-2, and 2-3 and used for correcting the original signal.

Each of the error coefficients is calculated by picking up the value corresponding to the phase of 0, π/2, π, or 3π/2 of the second normalized signal. However, the possibility that the phases to be measured exactly coincide with these values is not strong. On the other hand, since the measurement apparatus always calculates phases, the deviation of the measured phase from an ideal position is known even if a phase is different from the phase at which the above value is to be picked up although it is close. Since the second normalized signal is normalized in zero point and in amplitude, the second normalized signal at an ideal position can be estimated if the deviation from the ideal position is known.

Specifically, for example, the value to be corrected can be obtained by using the difference between the phase at which the value is to be picked up and the measured phase as an address and by referring a memory (ROMl) which stores the difference with respect to the value at the ideal position of the second normalized signal corresponding to the phase error. The value of the second normalized signal at the ideal position can be obtained by adding it to the value of the measured second normalized signal.

These configurations will be described again with reference to FIG. 1.

The correction signals U''', V''', and W''' outputted from the distortion correcting parts 2-1, 2-2, and 2-3 are inputted to a multiplexer 12. The multiplexer 12 outputs one signal selected from among the correction signals U''', V''', and W'''. The multiplexer 12 selects only one signal to output it because the correction signal which indicates a peak value is determined to a certain signal in accordance with the phase signal (angle θ) obtained by the phase arithmetic unit 6. Therefore, the multiplexer 12 selects any one of the correction signals to output it to the divider 8, in accordance with the value of the phase signal (angle θ) outputted from the phase arithmetic unit 6.

The divider 8 normalizes the correction signal. Specifically, the divider 8 generates a second correction signal (the second normalized signal) by dividing the correction signal by the average in one cycle of the signal of the square-root of sum of squares which is an output signal of the averaging arithmetic unit 7. In other words, the divider 8 is a second normalizing part which generates a plurality of second normalized signal by dividing the plurality of correction signals by the average square-root of sum of squares which has been calculated by the averaging arithmetic unit 7.

The second correction signal is inputted to an estimating unit 9. The estimating unit 9 picks up the second correction signal (the second normalized signal) at a predetermined phase. The predetermined phase is 0, π/2, π, or 3π/2 as described above, and the second correction signals at these phases are detected. The values of the second normalized signals at these phases are obtained by subtracting the error obtained by performing a table lookup using the difference between the ideal phase and the measured phase.

This value is stored by a signal storing unit 10 which is constituted by a RAM. However, there is a possibility that the value picked up at each time contains a noise. Therefore, it is preferable that the averaging processing of the already stored value and the newly obtained signal value is appropriately performed. For example, when the newly obtained value is represented by x and the stored value is represented by f, it is preferable that the stored value f is updated by the expression as follows.

$$f = f + p(x - f)$$

The arithmetic processing can be simplified if p is an inverse number of a power-of-two.

Next, using these values, the error of the coefficient for correcting the distortion is obtained by the distortion coefficient arithmetic unit 11, and the coefficient stored inside the apparatus is corrected using a part of the error. The coefficient error obtained by each of the calculations can be reduced by correcting a part of the error. Furthermore, the calculation can be simplified by appropriately selecting a correcting ratio.

Thus, in the distortion coefficient arithmetic unit 11, each of the error coefficients (distortion coefficients) updated based on the second normalized signal is fed back to the distortion correcting parts 2-1, 2-2, and 2-3 and is used for correcting the signal.

As described above, according to the embodiment of the present invention, the distortion information (error coefficient) is stored inside the measurement apparatus 100 with respect to each of the plurality of original signals outputted from the detecting unit 20. The correction signal from which the distortion of each of the original signals is removed is formed using this error coefficient. Furthermore, the square-root of sum of squares of each of the correction signals is calculated, and the phase is calculated using the first normalized signal which is obtained by dividing each of the correction signals by the square-root of sum of squares.

The distortion information of the original signal can be calculated in accordance with the deviation from an ideal state (sine wave) of the second normalized signal which is obtained by dividing the correction signal by the average of the square-root of sum of squares in one cycle of the signal.

The sum of squares of the correction signal is expected to be a constant value. The deviation from the value is determined as an influence of the noise superimposed on a power supply line or the like. Therefore, the influence of the power supply line or the like can be reduced by performing the division of the square-root of sum of squares so that the sum of squares is constant and by normalizing the correction signal. The correction signal does not substantially contain the distortion component. Therefore, each of the distortion factors can be obtained independently from other distortion factors by calculating the error of the distortion information of the signal based on the deviation from the ideal state. As a result, the measurement can be performed with high accuracy.

More specifically, the maximum value and the minimum vale of the second normalized signal is obtained based on the finally obtained phase information, and the distortion information with respect to the amplitude is calculated from the difference. Furthermore, the distortion information with respect to the zero point can be calculated from the average.

The information with respect to the phase error of the signal can be calculated from the difference of the values of the second normalized signal at two points of the zero cross points of the ideal signal which is determined by the finally obtained phase information (both values are ideally zero).

According to the principle of Fourier transform, all error factors can be represented as the sum of a sine function and a cosine function which are different in cycle. The phase at which the function provides the maximum value and the phase at which the function provides the minimum value are known, and also it is known that the sums of these function values picked up at a constant interval in one cycle of the sine and the cosine functions having the longest cycle are independent from each other. According to this principle, the distortion caused by variety of error factors can be responded by applying the same processing as described above.

As described above, in the present embodiment, in the apparatus which obtains the fine position or angle information by measuring the phase based on the sine-wave signal of two or three phases outputted from the apparatus measuring the position or the angle, the signal distortion caused by the drift of the zero point, the gain fluctuation, or the like, which is peculiar to analog circuits, can be always corrected. Furthermore, the influence of the noise which is superimposed on a power supply line, a light source, or the like is reduced. As a result, according to the present embodiment, a measurement apparatus which measures the position or the angle of the object to be measured with high accuracy can be provided.

The analog to digital converter which is available in the present age has a high resolution of 14 to 16 bits. Theoretically, it's possible that the phase information in which one cycle of the signal is divided into several tens of thousands by using such the analog to digital converter. However, the error caused by the unstableness of the analog circuit has established technical limitations in the past.

According to the measurement apparatus of the present embodiment, the error factor associated with using the analog circuit can be removed, and the position information can be obtained with accuracy which is theoretically predicted from the resolution of the analog to digital converter. As a result, the measurement apparatus of the present embodiment can be applied to the wide field in which the position or the angle needs to be measured with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298817, filed on Nov. 19, 2007, which is hereby incorporated by reference herein in its entirety.

What is claimed is:

1. A measurement apparatus configured to measure a position of an object using a plurality of different phase signals obtained based on displacement of the object, the apparatus comprising:
    a distortion correcting unit configured to generate a plurality of correction signals by correcting the corresponding plurality of different phase signals using a corresponding distortion coefficient which is stored in the apparatus;
    a square-root of sum of squares arithmetic unit configured to calculate a square-root of sum of squares of the plurality of correction signals;
    a first normalizing unit configured to generate a plurality of first normalized signals by dividing the corresponding plurality of correction signals by the square-root of sum of squares;
    a phase arithmetic unit configured to calculate a phase corresponding to the position of the object based on the plurality of first normalized signals;
    an averaging arithmetic unit configured to average a plurality of the square-root of sum of squares over one cycle of the plurality of correction signals;
    a second normalizing unit configured to generate a plurality of second normalized signals by dividing the corresponding plurality of correction signals by the averaged square-root of sum of squares; and
    a distortion coefficient arithmetic unit configured to update the distortion coefficient with respect to the plurality of different phase signals based on the corresponding plurality of second normalized signals, wherein the distortion coefficient arithmetic unit is configured to update the distortion coefficient with respect to one of an amplitude error coefficient, a zero point error coefficient and a phase error coefficient of the plurality of different phase signals based on two signals in corresponding the plurality of second normalized signals that correspond to predetermined two phases calculated by the phase arithmetic unit.

2. An apparatus according to claim 1, wherein the distortion coefficient arithmetic unit is configured to update the distortion coefficient with respect to one of the amplitude error coefficient and the zero point error coefficient using as the predetermined two phases a first phase at which the corresponding the plurality of second normalized signals is to have a maximum value and a second phase at which the corresponding the plurality of second normalized signals is to have a minimum value.

3. An apparatus according to claim 1, wherein the distortion coefficient arithmetic unit is configured to update the distortion coefficient with respect to the phase error coefficient using as the predetermined two phases third and fourth phases at which the corresponding the plurality of second normalized signals is to have a zero value.

4. An apparatus according to claim 3, wherein the distortion coefficient arithmetic unit is configured to update the phase error coefficient with respect to the plurality of different phase signals so that a total correction amount for the phase error coefficients with respect to all of the plurality of different phase signals is zero.

* * * * *